US012616886B2

(12) United States Patent
Lee et al.

(10) Patent No.: US 12,616,886 B2
(45) Date of Patent: *May 5, 2026

(54) STRUCTURAL ENERGY STORAGE WITH CARBON FIBER FOR SPORT EQUIPMENT SENSOR

(71) Applicant: TOYOTA MOTOR ENGINEERING & MANUFACTURING NORTH AMERICA, INC., Plano, TX (US)

(72) Inventors: Jae Seung Lee, Ann Arbor, MI (US); Paul Gilmore, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1150 days.

This patent is subject to a terminal disclaimer.

(21) Appl. No.: 17/574,621

(22) Filed: Jan. 13, 2022

(65) Prior Publication Data

US 2023/0218962 A1     Jul. 13, 2023

(51) Int. Cl.
*A63B 60/46*         (2015.01)
*B63H 16/04*         (2006.01)
(Continued)

(52) U.S. Cl.
CPC ............. *A63B 60/46* (2015.10); *B63H 16/04* (2013.01); *F41B 5/1484* (2013.01);
(Continued)

(58) Field of Classification Search
CPC ............... A63B 60/46; A63B 2220/30; A63B 2220/833; A63B 2102/02; H01M 4/133;
(Continued)

(56) References Cited

U.S. PATENT DOCUMENTS

| 7,750,790 B2 | 7/2010 | Yang et al. |
| 10,082,913 B2 | 9/2018 | Moller et al. |
| (Continued) | | |

FOREIGN PATENT DOCUMENTS

| CN | 109107122 B | * | 7/2020 | ........... A63B 49/035 |
| CN | 107926117 B | | 8/2020 | |
| (Continued) | | | | |

OTHER PUBLICATIONS

Till Julian Adam, et al., "Multifunctional Composites for Future Energy Storage in Aerospace Structures", Energies, vol. 11, Issue 2: 335, 2018, pp. 1-21.

(Continued)

*Primary Examiner* — Raleigh W Chiu
(74) *Attorney, Agent, or Firm* — Oblon, McClelland, Maier & Neustadt, L.L.P.

(57)         ABSTRACT

A sport apparatus, including a handle, an action portion, a connection portion connecting the handle to the action portion, at least part of the connection portion including a structural battery, the structural battery including one or more energy storage devices, each of the one or more energy storage devices having at least one anode core of a continuous carbon fiber, an electrolyte arranged on the at least one continuous carbon fiber core, and a cathode layer coating arranged to the at least one continuous carbon fiber core on the electrolyte, and at least one sensor unit electrically connected to the energy storage devices, the at least one sensor unit providing signals related to use of the sport apparatus.

7 Claims, 14 Drawing Sheets

(51) Int. Cl.

| | |
|---|---|
| *F41B 5/14* | (2006.01) |
| *F42B 12/38* | (2006.01) |
| *H01M 4/133* | (2010.01) |
| *A63B 102/02* | (2015.01) |
| *H01M 4/02* | (2006.01) |

(52) U.S. Cl.
CPC ........... *F42B 12/385* (2013.01); *H01M 4/133* (2013.01); *A63B 2102/02* (2015.10); *A63B 2220/40* (2013.01); *A63B 2220/833* (2013.01); *H01M 2004/027* (2013.01); *H01M 2220/30* (2013.01)

(58) Field of Classification Search
CPC ......... H01M 2220/30; H01M 2004/027; F41B 5/1484; F42B 12/385; B63H 16/04
See application file for complete search history.

(56) References Cited

U.S. PATENT DOCUMENTS

| | | | |
|---|---|---|---|
| 10,893,608 B2 | 1/2021 | Chou et al. | |
| 11,075,384 B2 * | 7/2021 | Linde ................... | H01M 4/523 |
| 2002/0076948 A1 | 6/2002 | Farrell et al. | |
| 2002/0121146 A1 | 9/2002 | Manaresi et al. | |
| 2010/0206614 A1 | 8/2010 | Park et al. | |
| 2017/0207425 A1 * | 7/2017 | Chun ................... | H01M 10/44 |
| 2017/0233902 A1 | 8/2017 | Grant et al. | |
| 2020/0287240 A1 * | 9/2020 | Hudak ................. | H01M 50/116 |
| 2021/0100452 A1 | 4/2021 | Brister et al. | |

FOREIGN PATENT DOCUMENTS

| | | | | |
|---|---|---|---|---|
| CN | 112386888 A | * | 2/2021 | ............. A63B 49/02 |
| KR | 10-1632109 B1 | | 6/2016 | |
| WO | WO-2011036567 A2 | * | 3/2011 | ............. A63B 49/00 |

OTHER PUBLICATIONS

"Coollang koospur Tennis Racket Sensor Tracker Motion Detector Analyzer with Bluetooth 4.0 Compatible with Android and iOS Smart Phone(Black)", https://www.amazon.com/Coollang-Detector-Analyzer-Bluetooth-Compatible/dp/B07Z5381TP/ref=sr_1_1?dchild=1&keywords=coollang+tennis&qid=1618852294&sr=8-1, Oct. 15, 2019, 7 pages.

"Coollang Smart Badminton Sensor Smart Xiaoyu 2.0", Coollang Intelligent Badminton, http://www.coollang-global.com/welcome/badminton, 2015-2021, 3 pages.

* cited by examiner

104

102

112

Attach to silicon adaptor

Attach with
2-way tape

700

720
704
702
704
706
704
702
704
706
704
702
704
706
720

710

800

820
806
802
804
802
804
806
802
804

810

1554 Nock

1552

1564

1550

1556 Arrow Tip

1522 Upper Limb

1502

1532 Arrow Rest

1526 Handle/Riser Section

1534 Grip

1524 Lower Limb

1512

1510

1528 Bow String

1508

1504

STRUCTURAL ENERGY STORAGE WITH CARBON FIBER FOR SPORT EQUIPMENT SENSOR

CROSS-REFERENCE TO RELATED APPLICATIONS

This patent application is related to non-provisional application Ser. No. 17/372,629 filed Jul. 12, 2021, the entire contents of which are incorporated herein by reference.

This patent application is also related to non-provisional application Ser. No. 17/574,685, filed Jan. 13, 2022, entitled "STRUCTURAL ENERGY STORAGE FOR CF BASED PERSONAL MOBILITY AND LIGHTWEIGHT DELIVERY" which is filed concurrently herewith, the entire contents of which are incorporated herein by reference.

This patent application is also related to non-provisional application Ser. No. 17/574,660, filed Jan. 13, 2022, entitled "STRUCTURAL ENERGY STORAGE FOR CF BASED POWERED MOBILE DEVICES" which is filed concurrently herewith, the entire contents of which are incorporated herein by reference.

This patent application is also related to non-provisional application Ser. No. 17/574,642, filed Jan. 13, 2022, entitled "APPLICATION OF STRUCTURAL ENERGY STORAGE WITH CARBON FIBER IN PERSONAL WEARABLE AND CARRIABLE DEVICES" which is filed concurrently herewith, the entire contents of which are incorporated herein by reference.

FIELD OF THE DISCLOSURE

This disclosure is directed to structural energy storage devices, containing a plurality of lithium ion batteries having an anode of a continuous carbon fiber core, applied to sports equipment having sensors in order to compensate for weight to power the sensors and alleviate problems associated with battery positioning and the effects of a battery on weight balance.

DISCUSSION OF THE BACKGROUND

The competitive racket sports and similar sports that use a hand-held sport implement are gradually adopting carbon fiber and one or more advanced sensor units attached onto its structure for advanced features such as swing, trajectory, and impact analysis. These sensor units are powered by replaceable or rechargeable batteries. In this disclosure, the spelling of the terms racket and racquet are used interchangeably.

A typical sensor unit for a tennis racket is shown in FIG. 1. The sensor unit 104 can be mounted on the end of a racket handle 102 using adhesives or rubber mounting band. The sensor unit 104 consists of multi axis accelerometer that senses racquet impact, swing speed etc. The sensor 104 unit has a built-in communication device such as Bluetooth or Wi-Fi by which the collected data are transmitted to a smartphone, personal computer, or a cloud service. These sensor units 104 include electronics, and being portable, are powered by battery. Typically, button style batteries (CRxxxx) are used. The bottom end of the racket is a preferred position for this sensor unit because this type of unit may be provided as an aftermarket component 112 and the bottom end is an easiest place to physically mount an aftermarket component 112. Also, the sensor unit itself can better endure against large impact at swing action.

The use of an impact sensor in racket sports is not limited to tennis, as it can be easily be applied to most racket/racquet sports; including badminton, squash, racquetball, table tennis, pickleball, etc. An example is found in FIG. 2 for badminton. According to the technical specification of Coollang (www.coollang-global.com/welcome/badminton), the sensor unit 202 weighs around 5 g. The sensor unit 202 may be attached to the racquet end by a special adapter 208, or the sensor unit may be mounted to the racquet end 206 with a 2-way tape 204.

A conventional golf swing analyzer is shown in FIG. 3. A motion sensor unit 304 is mounted at the end of club handle 302. The motion sensor unit 304 includes a micro USB port for charging and a Bluetooth communication unit. The motion sensor unit 304 outputs sensor signals that may be used to measure club head speed, up/down motion, and impact force. The same principle has been applied to baseball, hockey and lacrosse. FIG. 4 shows an example sensor unit 404 attached to the end of a hockey stick 402. For each of these hand-held sport implements, those hand-held sport implements that require relatively high strength of impact, the weight of the sensor is heavier and the electrical power required is higher than sport implements that do not require high strength of impact.

Rowing, canoeing, and kayaking are also adopting carbon fiber due to its superb mechanical properties. Research in these types of sports has attempted to mount cameras to monitor the oaring action by way of video images. The camera-based image sensor detects the motion of the oar. The post analysis of the recorded image stream can deliver information such as speed, stroke, and trajectory of rowing.

Another sport where sensors are being applied is archery, which can involve a recursive (Olympic style) or compound bow. A compound bow is preferably lighter weight as portability is an important feature for wildlife shooting. Carbon fiber has become a popular choice to reduce weight in a compound bow. In archery, a speed sensor has been introduced. Another electronic device that may be added to a bow is a laser sight. Since archery is very sensitive to weight and weight balance of the bow, the added weight of a sensor unit could disturb accuracy of action. Also, carbon fiber has become widely used as the material for an arrow.

These conventional approaches consider the battery and structure as separate components, and so the methods by which weight can be reduced are inherently limited, example methods include increase strength-to-weight ratio, increase stiffness, or increase energy density. An improved strategy to reduce the weight is through the use of multifunctional materials that simultaneously store electrical energy and serve as the frame structure. The so-called "structural battery" allows the frame structure to store energy, therefore allowing at least, some of the battery, and associated battery pack, to be eliminated.

SUMMARY OF THE DISCLOSURE

An aspect is a sport apparatus, including a handle, an action portion, a connection portion connecting the handle to the action portion, at least part of the connection portion including a structural battery, the structural battery including one or more energy storage devices, each of the one or more energy storage devices having at least one anode core of a continuous carbon fiber, an electrolyte arranged on the at least one continuous carbon fiber core, and a cathode layer coating arranged to the at least one continuous carbon fiber core on the electrolyte, and at least one sensor unit electrically connected to the one or more energy storage devices, the at least one sensor unit providing signals related to use of the sport apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
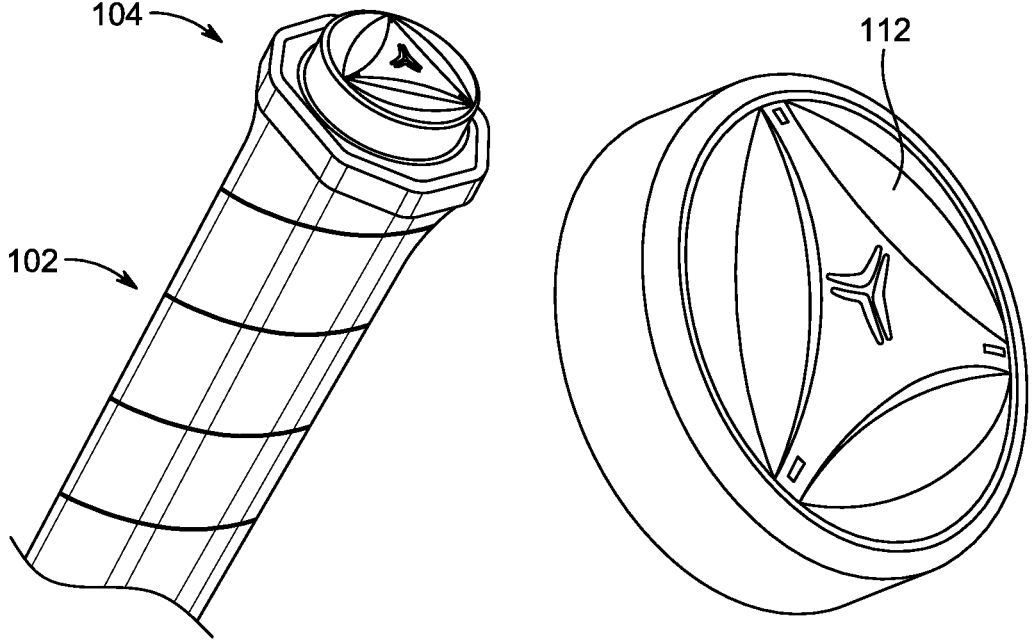
FIG. 1 illustrates a conventional tennis racket sensor.
Figure 2:
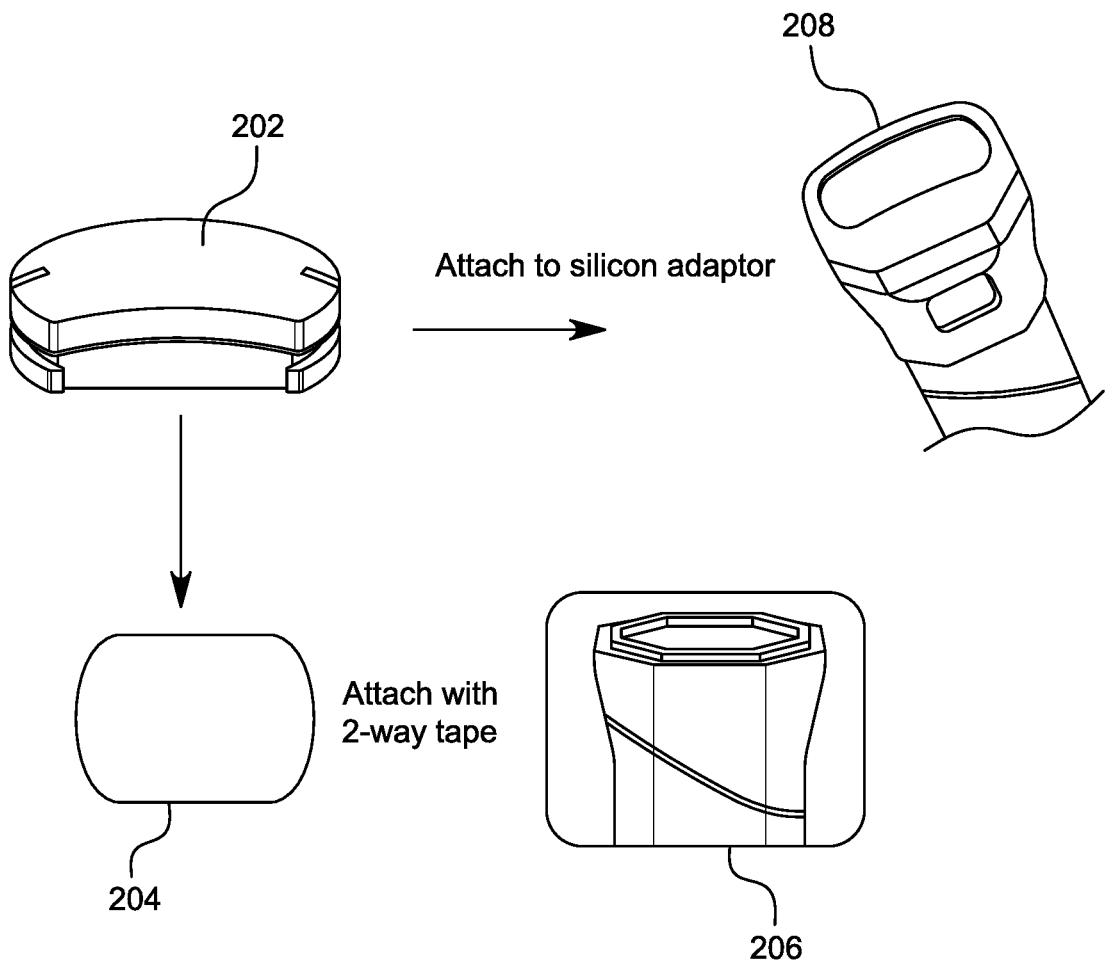
FIG. 2 illustrates a conventional impact sensor for a badminton racquet.
Figures 3, 4:
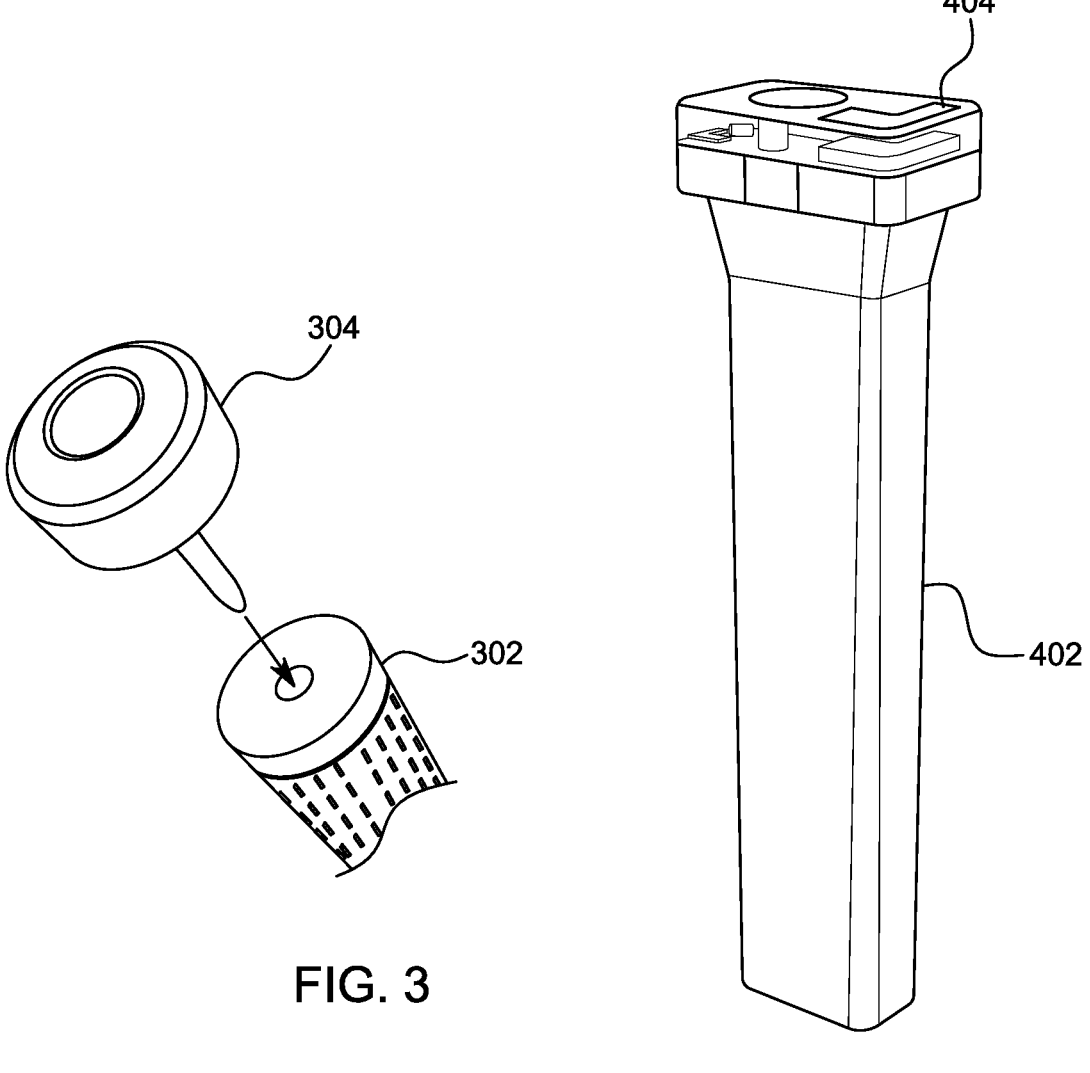
FIG. 3 illustrates a conventional sensor for a golf club.
FIG. 4 illustrates a conventional sensor for a hockey stick.

As used herein, the words "a" and "an" and the like carry the meaning of "one or more." The phrases "selected from the group consisting of" "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Disclosed embodiments relate to a structural energy storage formed in CF to supply electricity to various sensors either embedded in or attached on sport implements with reduced or no penalty of adding weight or disturbing weight balance of overall structure. The inventors recognized that a structural battery employing a carbon fiber core anode can bring about a weight reduction in an electrical sensor unit, as it would allow a power source in which a battery is reduced in size or eliminated. In an ideal case, if the structural battery has the same energy density and stiffness as a conventional battery and structure respectively, the mass of the overall sensor unit may be reduced by as much as 25-35%. However, even if the ideal is not achieved, significant weight reduction would still be possible depending on the structural mass efficiency and structural energy efficiency attained with the device. Moreover, the structural battery employing a carbon fiber core anode may be extended to a wide range of utilities where the marriage of energy storage and structural form and support could be beneficial.

The structural battery includes two main components:

1. A mechanically compliant electrolyte coated onto the carbon fiber that acts as a mechanical buffer layer between the carbon fiber and cathode while simultaneously conducting lithium ions.

2. A composite cathode designed to have a very low volume expansion by embedding active material particles in a conductive polymer matrix.

The mechanically compliant electrolyte may have low stiffness but provides good adhesion to the anode and cathode.

In some embodiments, a structural battery may include one or more coaxial energy storage devices. A coaxial energy storage device may be prepared by first coating a continuous carbon fiber with an electrolyte precursor coating solution containing a lithium salt, a polymer or monomer which solvates lithium ion, a gel or elastomer matrix polymer or oligomer, a UV sensitive cross-linking agent, a photoinitiator and a plasticizer. The polymer or monomer which solvates lithium ion and the gel or elastomer matrix polymer or oligomer may be the same material and correspond to the polymers used for the electrolyte or the precursors thereof.

The lithium salt provided in the gel or elastomer of the electrolyte coating comprises at least one selected from the group consisting of $LiTFSI$, $LiBF_4$, $LiPF_6$, $LiClO_4$, $LiCF_3SO_3$, $LiCl$ and $LiAsF_6$. Combinations of these may be employed and other additives to enhance lithium ion conductivity may be included.

Conventionally known photoinitiators compatible with the polymer and/or oligomer are employed and may include but are not limited to any of aminoacetophenones, phosphine oxides, benzophenones, benzyl formates and thioxanthones. Such photoinitiators are commercially available.

The cross-linking agent employed is determined by the polymer of oligomer structure and is well known to one of skill in the art.

The electrolyte material composition is dissolved in a carbonate solvent or ether solvent system and my then be applied to the continuous carbon fiber by any suitable coating method which applies a uniform and complete coating to the entire carbon fiber surface. In one embodiment, in preparing the electrolyte coating composition it may be necessary to prepare a composition which forms a contact angle on the carbon fiber surface of 100° or less. The lower the contact angle the thinner the coating that can be applied to the carbon fiber. The contact angle may be controlled by selection of solvent and plasticizer, concentration of the lithium salt and polymer, and temperature. In one embodiment, the electrolyte may also be coated onto the carbon fibers using vacuum bagging or vacuum infusion technique. The electrolyte precursor solution can be infiltrated into the carbon fiber.

Figure 5:
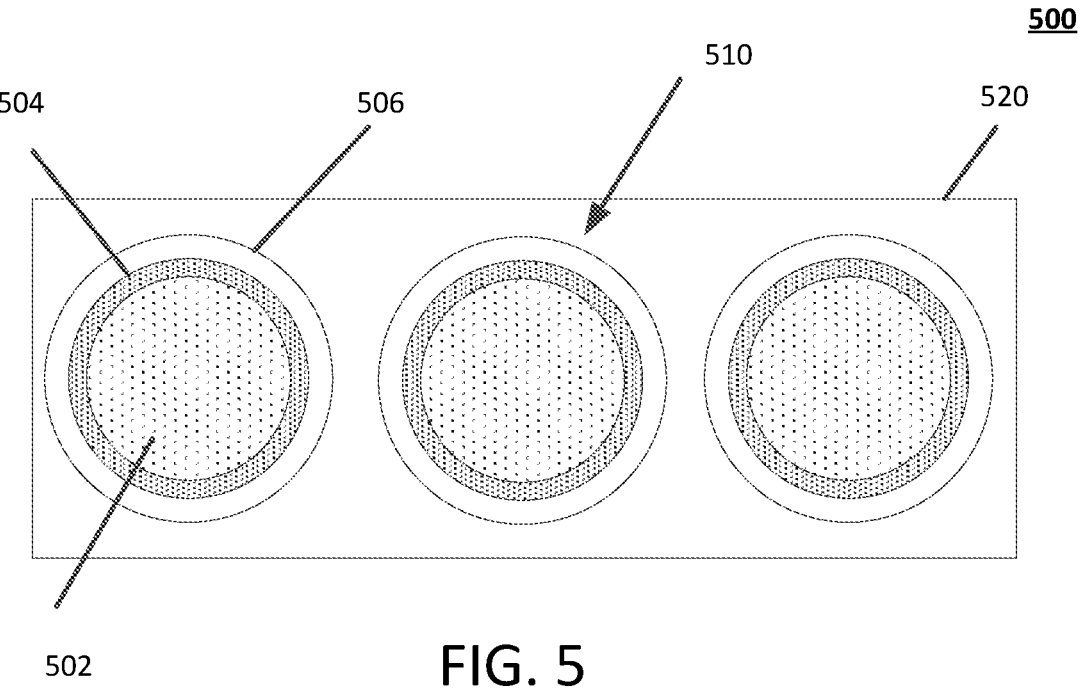
FIG. 5 shows a schematic drawing of a structural arrangement of coaxial energy storage devices in a shell according to an embodiment of the disclosure.

FIG. 5 shows a schematic drawing of a structural arrangement of coaxial energy storage devices in a shell according to an embodiment of the disclosure. Once the electrolyte coating 504 is applied to the continuous carbon fiber 502, it is exposed to UV irradiation to cure the polymer matrix coaxially arranged about the carbon fiber which is now the core of the device. The solvent remains in order to obtain the elastic electrolyte coating layer.

Next the cathode coating 506 is applied to the surface of the elastic electrolyte coating 504.

A plurality of the coaxial energy storage device 510 is arranged within a shaped composite battery structure 500 having a shell 520 or outer coating and an inner matrix enclosed by the shell. The matrix encloses the plurality of coaxial energy storage devices 510.

Figure 6:
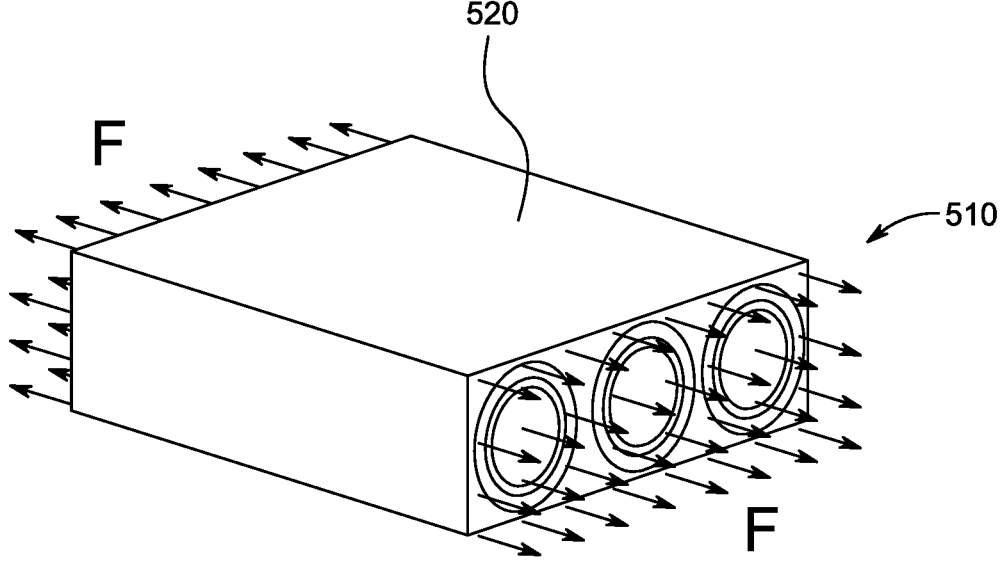
FIG. 6 shows another schematic drawing of a structural arrangement of coaxial energy storage devices in a shell according to an embodiment of the disclosure.

Once the electrolyte and cathode layers are coated onto the carbon fibers, the coaxial energy storage devices 510 are arranged within a shell 520 having a structure and are subsequently impregnated with a matrix material as schematically represented in FIG. 6. The composite battery structure 500 schematically represented in FIG. 6 with embedded energy storage can be formed to perform in a wide variety of structural applications while provided electrical power to devices requiring energy or supplementing the energy requirement of the device.

The shell 520 may be composed of a metal and/or a fiber reinforced plastic. Materials employed for such sandwich shell matrix composites are conventionally known for example in the construction of airplane components, automobile components, protective equipment and other vehicles for transportation and sport. In particular, the matrix enclosed by the shell 520 may comprise a resin selected from the group consisting of (meth) acrylate resins, epoxy resins, diallyl phthalate resins and phenolic resins.

The coaxial energy storage devices 510 may be arranged within the composite structure in any arrangement. For example, unidirectionally and in parallel, in a mat arrangement wherein the coaxial energy storage device are oriented both in weft and warp orientations or in only one of weft and warp while the other direction is occupied by a structural fiber such as a glass fiber, a carbon fiber or an aramid fiber.

Figure 7:
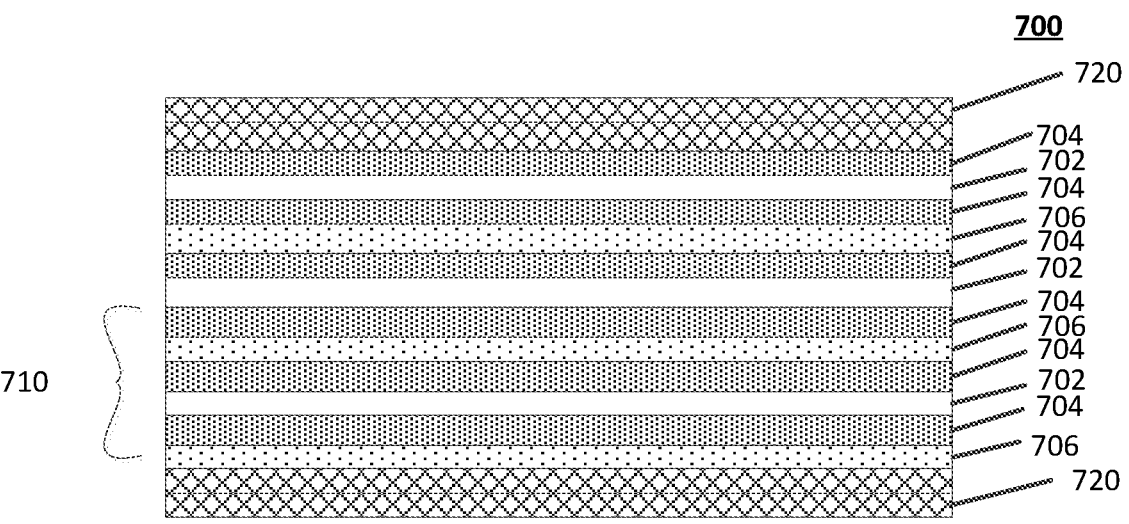
FIG. 7 shows a schematic drawing of a structural arrangement 700 of laminate energy storage devices between shell layers.

In some embodiments, a structural battery may include structural laminate energy storage devices. FIG. 7 shows a schematic drawing of a structural arrangement 700 of laminate energy storage devices between shell layers. An electrolyte layer 704 is applied to a continuous carbon layer 702 and is exposed to UV irradiation to cure the polymer matrix arranged on the carbon layer. The solvent remains in order to obtain the elastic electrolyte coating layer.

Next a cathode layer 706 is applied to a surface of the electrolyte layer 704 to forma a laminate energy storage device 710.

A plurality of the laminate storage device 710 is arranged within a shaped composite structure having a shell layer 720 or outer coating and an inner matrix enclosed by the shell. The matrix encloses the plurality of laminate energy storage devices 710.

Figure 8:
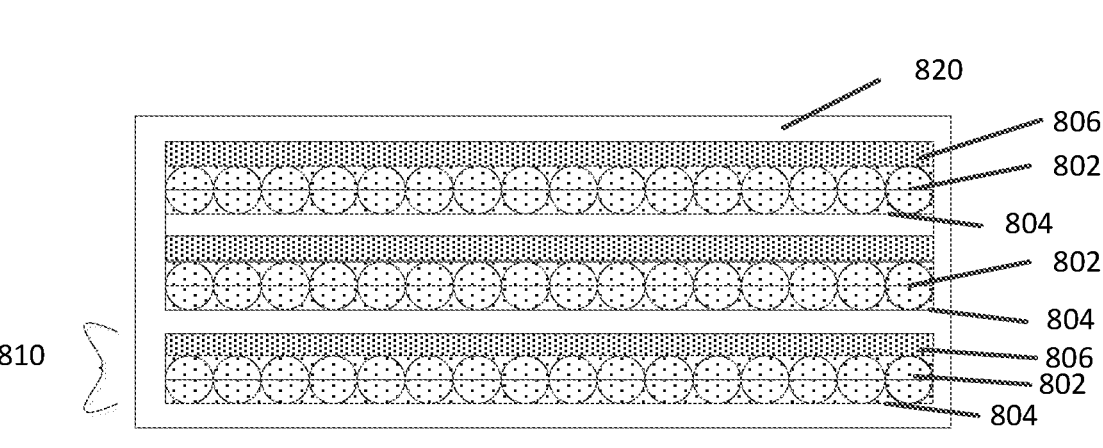
FIG. 8 shows a schematic drawing of a structural arrangement of laminate energy storage devices with carbon fibers.

In some embodiments, a structural battery may include structural laminate energy storage devices in which a carbon layer is a plurality of carbon fibers 802. FIG. 8 shows a schematic drawing of a structural arrangement of laminate energy storage devices with carbon fibers. Once an electrolyte coating 804 is applied to the continuous carbon fibers 802, it is exposed to UV irradiation to cure the polymer matrix coaxially arranged about the carbon fiber which is now the core of the device. The solvent remains in order to obtain the elastic electrolyte coating. A cathode layer 806 is applied to a surface of the electrolyte coating 804 to form a laminate energy storage device 810. A plurality of the laminate storage device 810 is arranged within a shaped composite structure having a shell layer 820 or outer coating and an inner matrix enclosed by the shell. The matrix encloses the plurality of laminate energy storage devices 810.

Figures 9A, 9B:
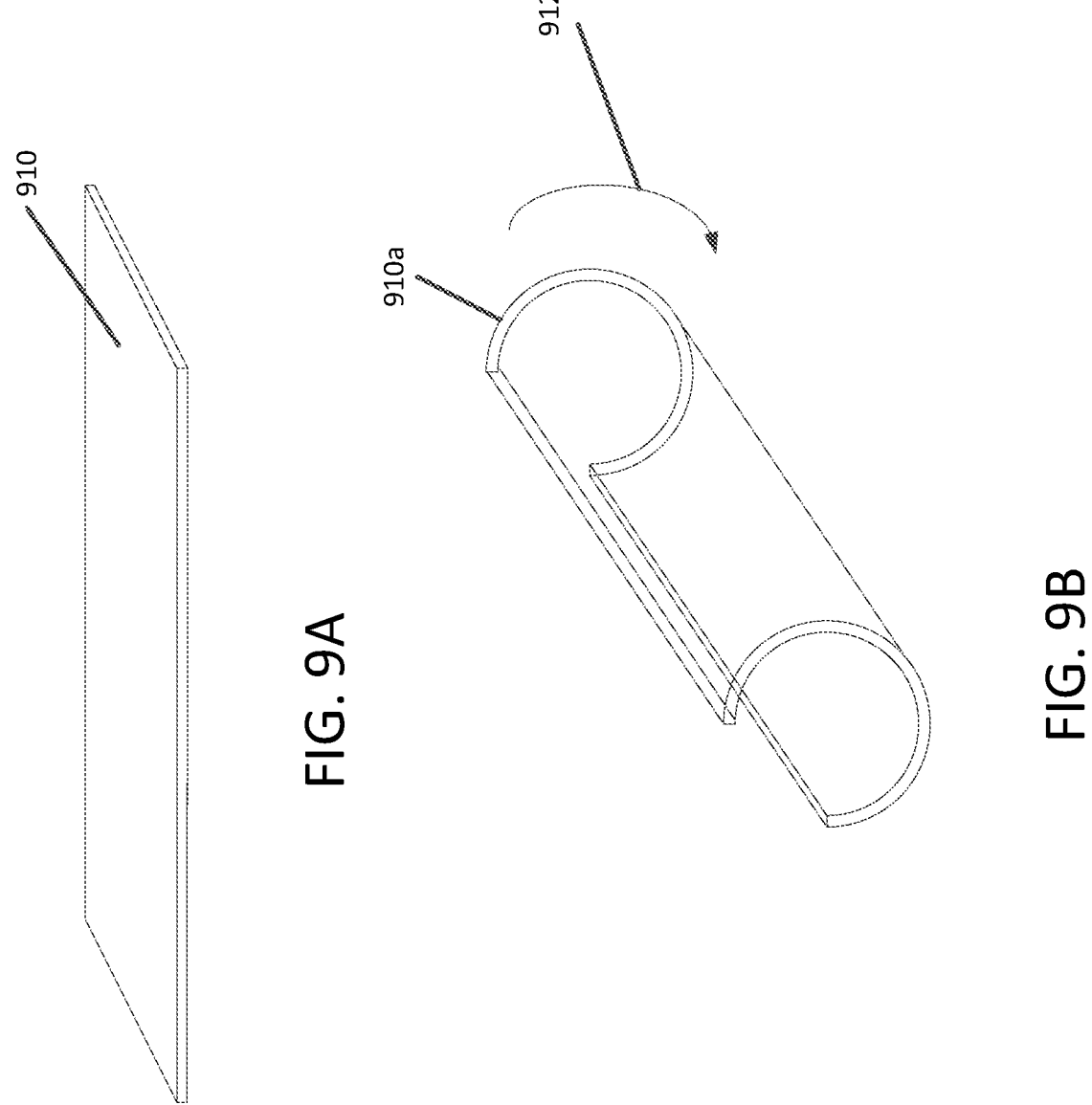
FIGS. 9A, 9B illustrate steps in forming a carbon fiber mat into a shape.

In manufacturing, the Carbon Fiber composite battery structure can be made into a mat arrangement, shaped into a desired shape, and cured. FIGS. 9A, 9B illustrate steps in forming a carbon fiber mat into a shape.

FIG. 9A shows where the carbon fiber composite structure is in a mat arrangement 010. FIG. 9B shows where the mat is formed 912 into a shape 910a. When the desired shape is obtained, the final shape 910a is cured. Although the shape shown in FIG. 9B is curved, the mat 910 in FIG. 9A may be folded at one or more creases to form various shapes, such as rectangular-like cross-section shapes, oval-like cross-section shapes, to name a few.

Figures 10A, 10B:
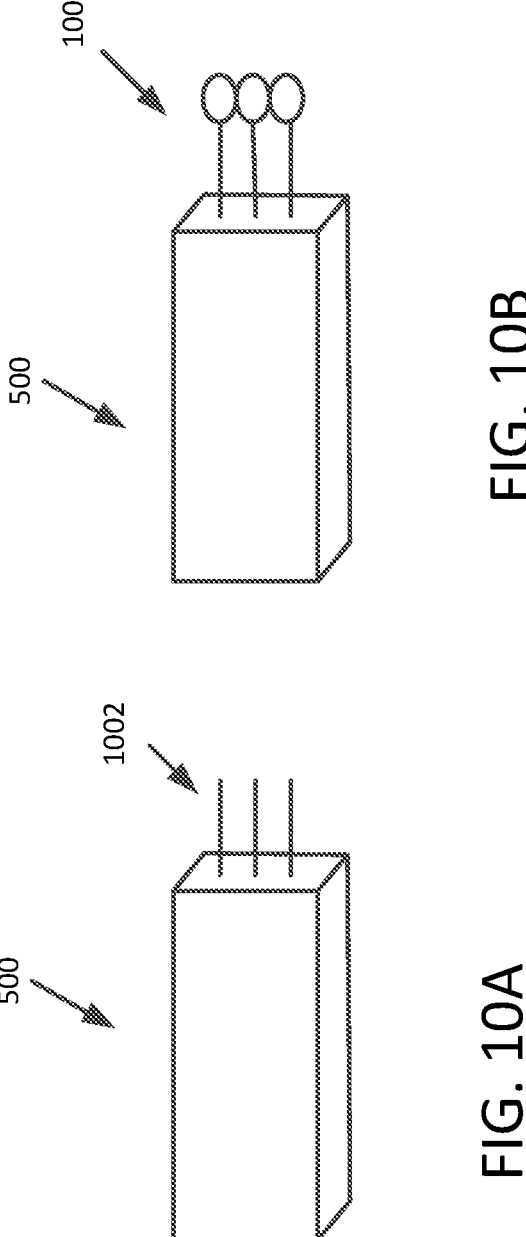
FIGS. 10A, 10B is a schematic of a connection structure for a structural battery.

FIGS. 10A, 10B is a schematic of a connection structure for a structural battery. Connection to the structural battery 500 (or 700, 800) may be by a wired connection 1002 or a wireless connection 1004. In the case of a wired connection 1002, the structural battery 500 (or 700, 800) may include wire terminals extending from an end of the composite structure 500. In the case of a wireless connection 1004, the structural battery 500 (or 700, 800) may include one or more coils at an end of the composite structure 500. In addition, the structural battery may be configured with a charge unit that may be connected by the wired connection 1902 or the wireless connection 1004.

As shown in FIG. 1 above, sensor units 112 can be mounted on the bottom end of a tennis racket handle 102. The sensors and other electronics in the sensor unit 112 are powered by a battery. The battery itself typically weighs 3-5 gram and a battery housing and connection can add more weight to it. Weight balance is important performance specification in tennis. For example, a weight balance index is used to define head light vs head heavy. The balance of weight is impacted when a small amount of weight added in either end of the racket (head or handle). In addition, weight of the racket is also a factor. Thus, the imbalance and added weight could directly influence the characteristics of racket performance.

Further, the battery may become out of position due to impact from swing action and striking a ball by the racket. The battery may become dislodged, leading to failure of the sensors and other electronics to operate. The sensor unit 112 itself may be mounted by a screw. The screw may become loose and even eventually fall out.

Figure 11A:
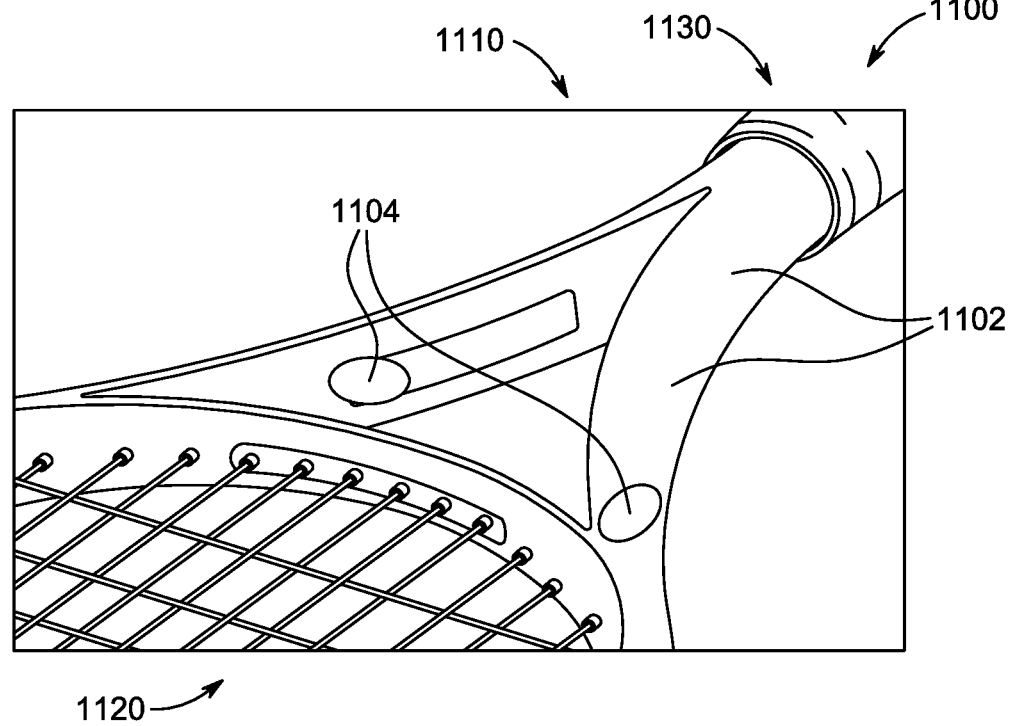
FIGS. 11A, 11B is a schematic drawing of a racket/racquet frame structure according to an embodiment of the disclosure.
Figure 11B:
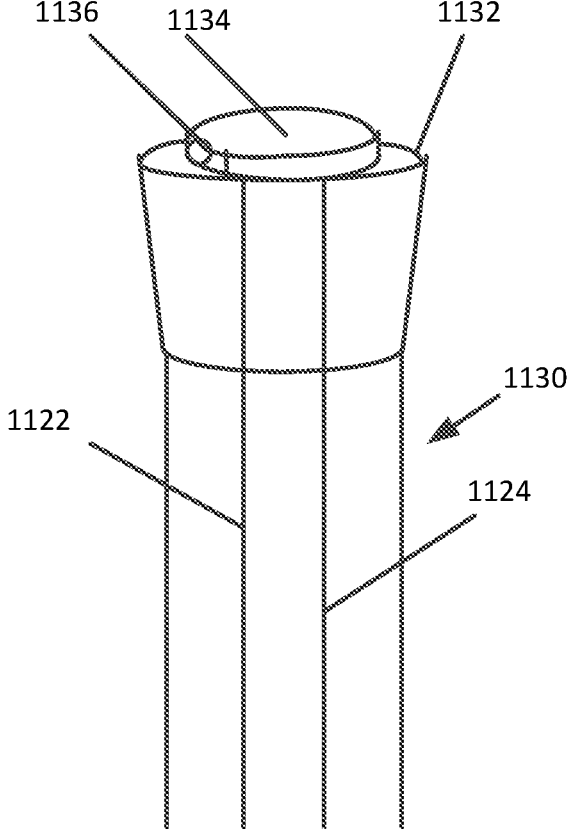

On other hand, many racket/racquet products are now made with composites, such as carbon fiber. An advantage of composite materials is their high stiffness and low density, combined with versatility of parameters including racket shapes, mass distribution, and stiffness. Strength of a carbon fiber racket frame may be increased by two-dimensional weaving that orients the molecules in the fibers in a layer to maximize strength. FIGS. 11A, 11B is a schematic drawing of a racket structure according to an embodiment of the disclosure. Racket balance is a static measure of weight distribution in a racket and measured from the butt end in inches and/or centimeters. Commonly referenced in "points" head light or head heavy—each "point" represents ⅛ inch. Heavier rackets are generally head light to maintain maneuverability. Some super-light rackets are head heavy to supply enough mass to the area of the frame where the ball is being contacted. In addition to racket balance, racket swingweight is a measure of how heavy a racket feels when swung, i.e. maneuverability. Also known as Moment of Inertia or Second Moment, swingweight is dependent on several factors, including racket weight, length, balance, head size. A heavy swingweight racket is more powerful than a light swingweight racket, but will be less maneuverable. Also, a heavy swingweight racket can be relatively light in overall weight by placing the majority of weight in the head. An objective in some rackets is to retain maneuverability without sacrificing power by distributing most of the overall weight to the upper hoop, where ball contact is made. Swingweight can be increased by adding weight above the pivot point (where the racket is gripped) or by increasing length.

The racket frame 1110 may be made of a carbon fiber composite to give optimum light weight, weight balance, and strength. Regarding FIG. 11A, as a power source, a carbon fiber composite battery 1102 can be embedded in/along the racket frame 1110 in a mid-portion between the handle 1130 and the racket head 1120. The position of the carbon fiber composite battery 1102 may be adjusted to obtain a desired balance. Also, strength of the mid-portion may be adjusted to match the carbon fiber composite of the racket frame 1110. In some embodiments, the handle 1130 and/or head 1120 may also be made of the same carbon fiber composite as the racket frame 1110. In some embodiments, the handle 1130 and/or head 1120 may be made of different materials than the material of the racket frame 1110. The racket frame 1110 may be made of carbon fiber, the head may be made of an aluminum metal mixed material, and the handle 1130 may be a wooden handle.

One or more sensors may be mounted to the tennis racket 1100. In one or more embodiments, an accelerometer 1104 can be mounted on an inner surface of the mid-portion frame 1110 in proximity to the carbon fiber composite battery 1102. Preferably a set of two accelerometers 1104 can be mounted in each side of the mid-portion of the frame 1110 in order to monitor spin impact during a stroke. A multi-axis accelerometer 1104 may sense impact, free swing speed etc.

Regarding FIG. 11B, a communication unit 1134 can be mounted on the bottom end of racket handle 1132 using adhesives or rubber mounting band. The unit has a built-in communication device such as Bluetooth or Wi-Fi by which the collected data are transmitted to a smartphone, personal computer, or cloud service. The communication electronics, being portable, may be powered by a carbon fiber composite battery 1102 by way of a power wire 1122 that runs through handle 1130. The carbon fiber composite battery 1102 may be recharged by way of a power interface 1136 located in a compartment of the communication unit 1134. The power interface 1136 may be a USB port or other power connection. Signals from the accelerometers 1104 may be transmitted over a wire 1124 that also runs through the handle 1130.

FIGS. 12A, 12B, 12C, 12D are schematic drawings for various types of sport implement handles/shafts according to embodiments of the disclosure. In each of the various sport implements that have handles, such as those in FIGS. 12A to 12D, the entire stick/shaft may be made of a carbon fiber composite. In the case of a golf club, the entire shaft may be made of carbon fiber composite material. In the case of baseball/softball bats, the carbon fiber composite material can make up all or part of the bat. Some high end hockey sticks are made of carbon fiber composite material. Some high end kayak/canoe/rowing paddles/oars have handles and shafts that are made of carbon fiber composite material. The paddle itself may be made of a different material, such as nylon.

For these various sport implements that have handles, as the strength of impact is required to be higher, the weight of the sensor unit and required power are increased. For example the weight of hockey sensor is around 35 g which is 7 times heavier than a sensor for a badminton racquet, which requires a lower impact strength.

Figures 12A, 12B, 12C, 12D:
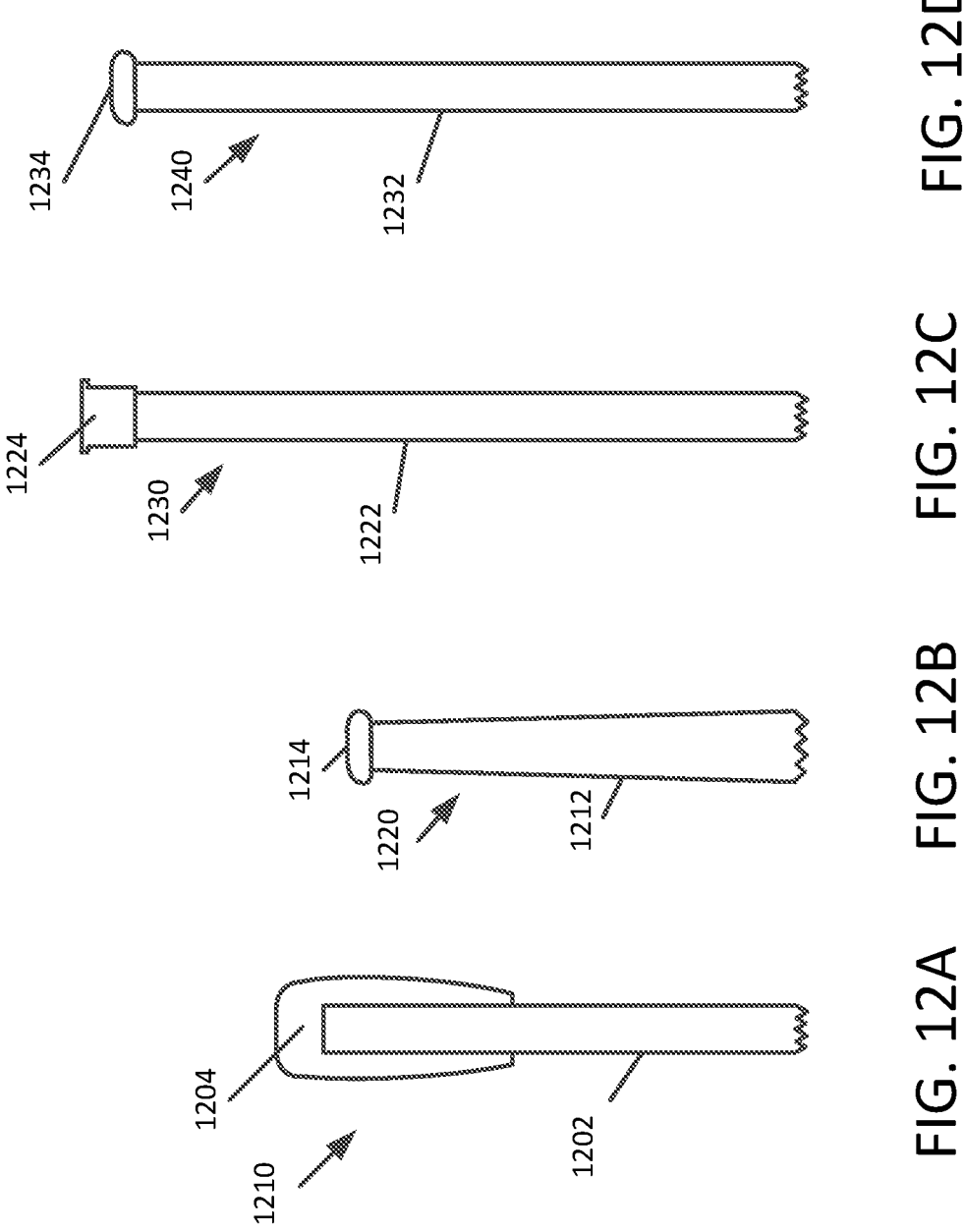
FIGS. 12A, 12B, 12C, 12D are schematic drawings for various sport implement handles according to embodiments of the disclosure.

FIG. 12A illustrates a shaft for a sport implement that has an enhanced grip portion, such as a golf club. A grip portion 1204 of a golf club 1210 may be wrapped around or formed over an end of a golf club shaft 1202. The grip portion 1204 may be made of a soft material that is easy to grip without slippage of the hand, such as rubber or synthetic rubber materials.

The golf club shaft 1202 may be made of carbon fiber composite material. All, or a portion of, the carbon fiber composite material of the golf club shaft 1202 may be formed as a carbon fiber composite battery. The size of the carbon fiber composite battery depends on the amount of power needed for the sensor section and amount of usage between charges.

Figure 13:
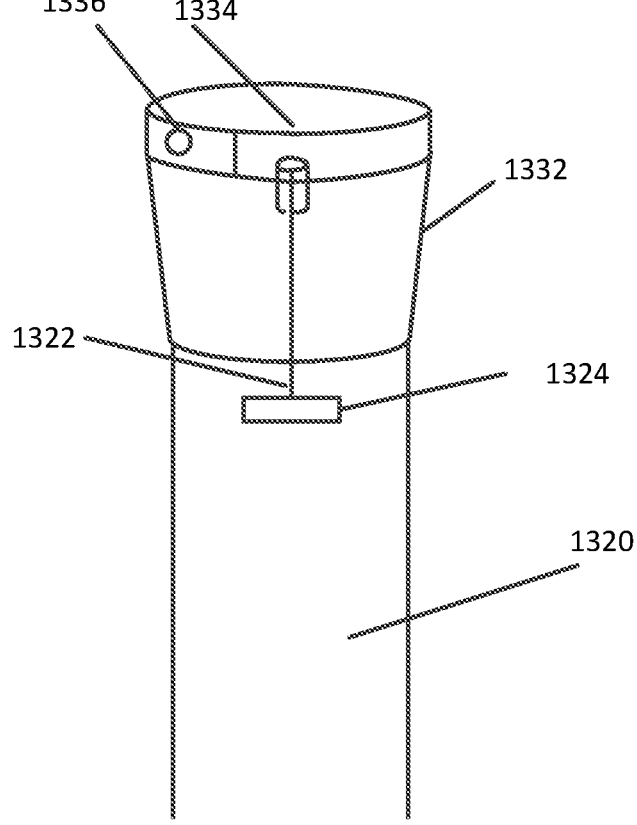
FIG. 13 is a schematic drawing of a sensor section for a club according to an embodiment of the disclosure.

FIG. 13 is a schematic drawing of a sensor section for a club according to an embodiment of the disclosure. The golf club sensor section 1334 is mounted at a top end 1332 of a club handle. The golf club sensor section 1334 may be connected to the carbon fiber composite battery 1320 of the carbon fiber golf club shaft 1202 at least one terminal interface 1324 using a wired connection 1322. The golf club sensor section 1334 may include one or more external interfaces 1336 that may be used to recharge the carbon fiber composite battery 1320.

The external interface 1336 may be a USB port or other power connection, or may include a coil for wireless charging. A separate docking station may be provided into which one of more golf clubs may be stored for wireless charging of the golf clubs, or plugged in for wired charging. The docking station may be in the form of a rack for storing a set of golf clubs having carbon fiber composite batteries.

The sensor section 1334 may include an accelerometer, such as a multi-axis accelerometer, for measuring swing motion/speed and impact force of the golf club. The sensor section 1334 may include a communication unit for transmitting sensor signals. The communication unit may use Bluetooth or WiFi for communication.

A similar principle may be applied to baseball, hockey and lacrosse.

FIG. 12B illustrates a handle portion of a sport implement that has a tapered handle, such as a baseball/softball bat. All or part of the baseball/softball bat 1220 may be made of carbon fiber composite material. All, or a portion of, the carbon fiber composite material of the bat 1220, including an end portion 1214, may be formed as a carbon fiber composite battery 1212.

The end portion 1214 may include a sensor section. Alternatively, a sensor section may be a separate device mounted to a free end of the end portion 1214. The size of the portion of the carbon fiber composite battery 1212 may depend on how much power is required for the sensor section. The portion of the carbon fiber composite battery 1212 is preferably in the smaller end of the bat that is adjacent to the sensor unit.

The sensor unit may include a communication unit, as well as an accelerometer. In addition one or more accelerometers may be incorporated into the shaft portion adjacent to an area where the sport implement that comes into contact with the hitting object, such as a baseball or softball.

FIG. 12C illustrates a handle portion for a sport implement having a squared cross-section, such as a hockey stick. Some high end hockey sticks are made of carbon fiber composite material. All, or a portion of, the carbon fiber composite material of the hockey stick 1230, including an end portion 1224, may be formed as a carbon fiber composite battery 1222.

The end portion 1224 may include a sensor section. Alternatively, a sensor section may be a separate device mounted to a free end of the end portion 1224. The carbon fiber composite battery 1222 may be positioned adjacent to the sensor section. In addition one or more accelerometers may be incorporated into the stick portion adjacent to an area where the sport implement that comes into contact with the hitting object, such as a hockey puck.

FIG. 12D illustrates a handle portion for a sport implement that has an extended handle/shaft with a paddle. Some high end kayak/canoe/rowing paddles/oars have handles and shafts that are made of carbon fiber composite material. Some conventional rowing, canoeing, and kayaking have used sensors to monitor the oaring action. In particular, a camera-based image sensor detects the motion of the oar. The post analysis of the recorded image stream can deliver information such as speed, stroke, and trajectory of rowing. However, the results from the image information lack information that could be obtained using different sensors, such as a strain gauge and accelerometer.

Figure 14:
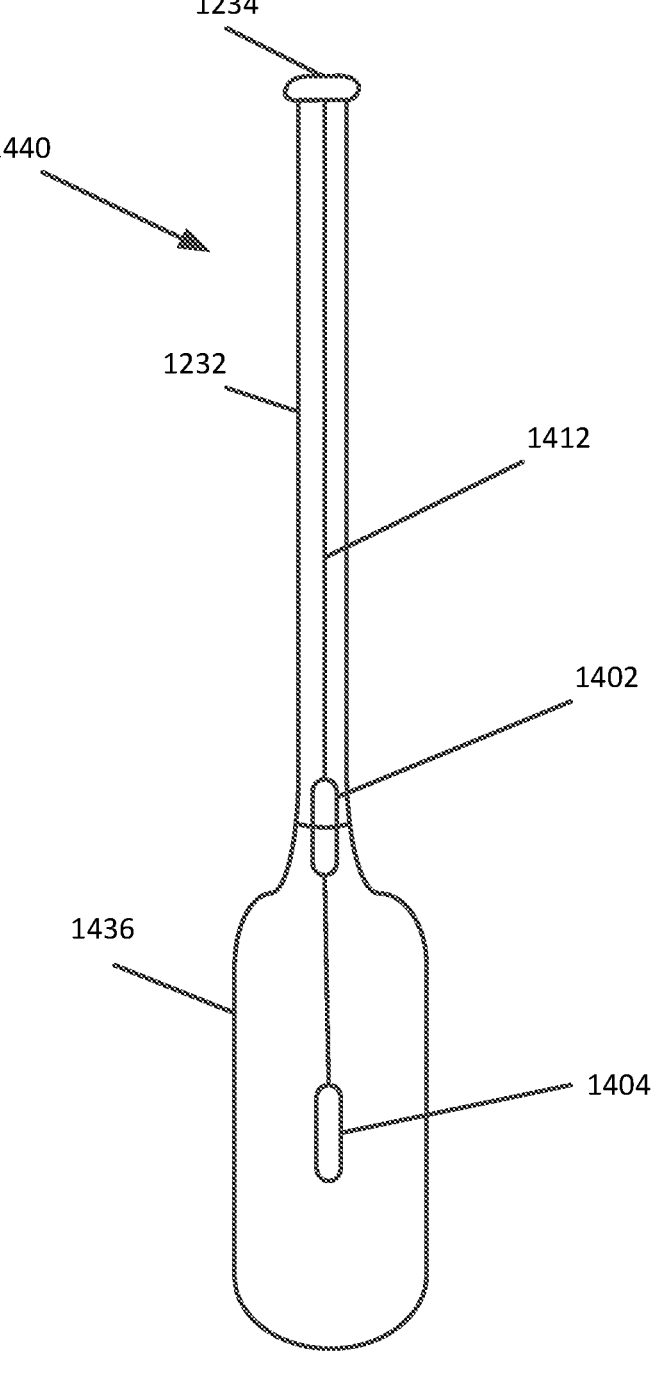
FIG. 14 is a schematic drawing of an oar structure according to an embodiment of the disclosure.

FIG. 14 is a schematic drawing of an oar structure according to an embodiment of the disclosure.

A strain gauge and accelerometer can be mounted on the oar surface, or embedded within the oar, which could measure the mechanical stress on the paddle 1436 and/or shaft 1232 of the oar. The structural energy storage, as well as sensor units can be embedded in a CF composite located along the shaft of the oar. The accelerometer, as well as a communication unit, may be mounted as a sensor unit 1234 on a free end of the handle of the oar. The strain gauge (1402, 1404) may be mounted within or on a surface of the paddle (1404) and/or the shaft (1402) of the oar having the structural energy storage. The strain gage 1402, 1404 may be electrically connected to the sensor unit 1234 by a wired connection 1412.

Figures 15A, 15B:
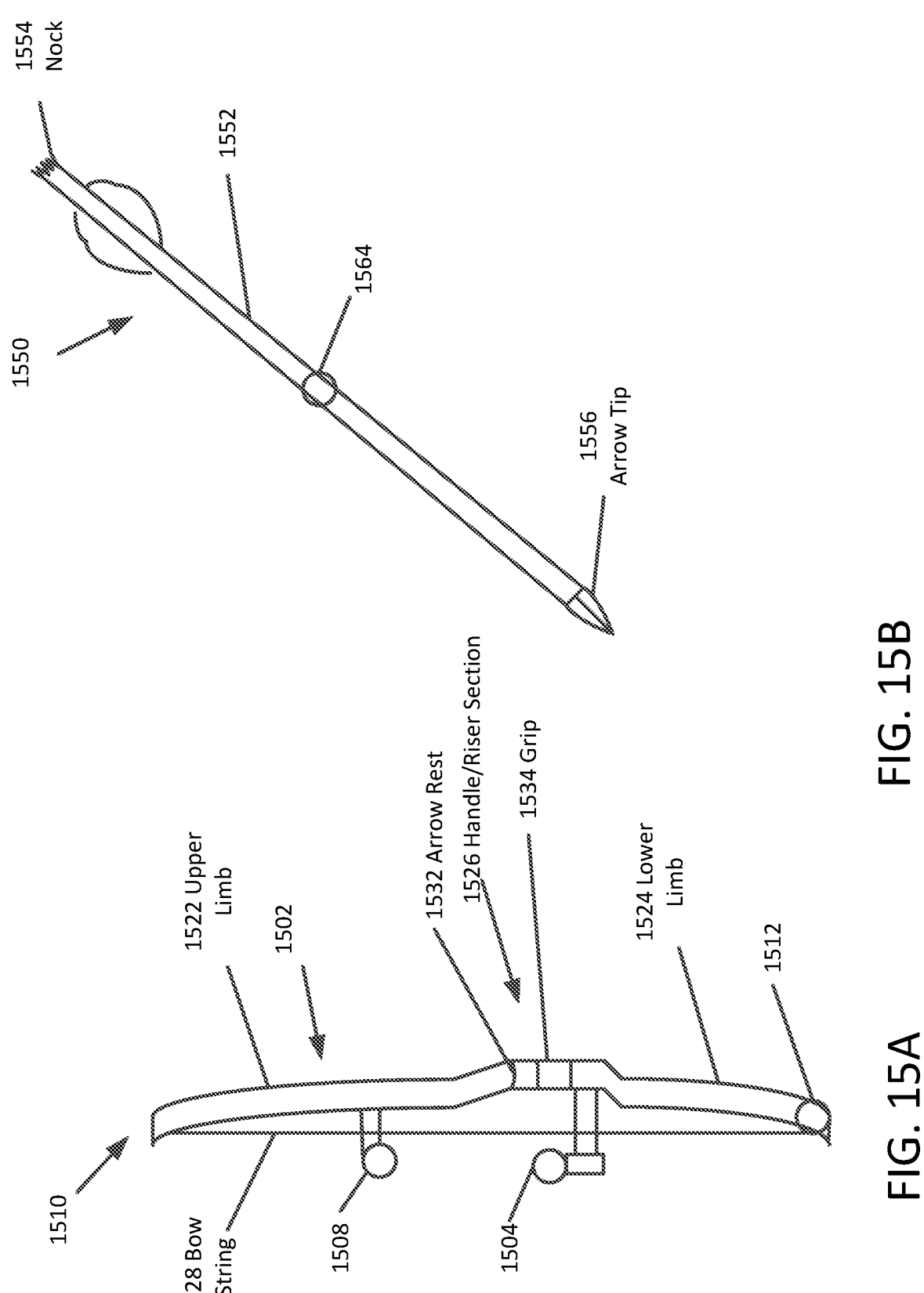
FIGS. 15A, 15B are a schematic drawing of a bow and arrow structure according to an embodiment of the disclosure.

FIGS. 15A, 15B are a schematic drawing of a bow and arrow structure according to an embodiment of the disclosure. In archery, a speed sensor 1504 may be mounted on the bow 1510 in order to measure a speed of ejection of an arrow. Another electronic device that may be added to a bow is a laser sight 1508 to aid in aiming at a target. However, since archery is very sensitive to the weight and weight balance of a bow 1510, the addition of a sensor unit could disturb accuracy of action. As with other sports equipment, the weight of a sensor unit is primarily due to the weight of a battery to provide power for the sensor. On the other hand, carbon fiber is being widely used as the primary material in archery bows and arrows.

The application of a carbon fiber composite battery for embedded energy storage in the bow frame 1502 would allow integration of various sensors for the bow without substantial change in weight or weight balance. The carbon fiber composite battery may be provided as the material for the entire frame 1502, or may be incorporated in portions of the carbon fiber frame 1502. The sensors may be connected to wire terminals of the carbon fiber composite battery. Also, the carbon fiber composite battery of the bow frame 1502 may be provided with an interface 1512 for recharging the battery, such as a USB port, or other power connection.

A typical archery bow 1510 includes an upper limb 1522, a lower limb 1524, a handle/riser section 1526, and a bow string 1528. The handle/riser section 1526 includes an arrow rest 1532 and a grip 1534.

In the case of an archery arrow 1550, the arrow shaft 1552 may be formed to include a carbon fiber composite battery. The carbon fiber composite battery may be used as a power source for a compact LED or GPS tracker embedded in the arrow 1550 for wildlife tracking or target shooting where camera imaging becomes difficult. The archery arrow 1550 typically includes a nock 1554 for placing an arrow in the bow string 1528, and an arrow tip 1556. An interface 1564 may be provided for recharging the carbon fiber composite battery of the arrow 1550.

The above description is presented to enable a person skilled in the art to make and use the embodiments and aspects of the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

The invention claimed is:

1. A sport apparatus, comprising:
a handle;
an action portion;
a connection portion connecting the handle to the action portion, at least part of the connection portion including a structural battery, the structural battery including one or more energy storage devices;
each of the one or more energy storage devices having:
at least one anode core of a continuous carbon fiber,
an electrolyte arranged on the at least one continuous carbon fiber core, and
a cathode layer arranged to the at least one continuous carbon fiber core on the electrolyte; and
at least one sensor unit electrically connected to the one or more energy storage devices, the at least one sensor unit outputting signals related to use of the sport apparatus.

2. A sport apparatus, comprising:
a handle;
an action portion;
a connection portion connecting the handle to the action portion, at least part of the connection portion including a structural battery, the structural battery including one or more energy storage devices, wherein
each of the one or more energy storage devices having a laminate structure with:
at least one anode core of a plurality of continuous carbon fibers,
an electrolyte coating arranged on the plurality of continuous carbon fibers, and
a cathode layer arranged on the electrolyte coating.

3. The sport apparatus of claim 1, wherein
the handle, the action portion, and the connection portion form a tennis racket, the action portion is a head of the tennis racket, and the structural battery is located at a position at a mid-portion of the connection portion.

4. The sport apparatus of claim 3, wherein the at least one sensor unit includes an accelerometer mounted on an inner surface of the mid-portion of the connection portion.

5. The sport apparatus of claim 4, wherein the accelerometer is a multi-axis accelerometer to detect an impact speed and free swing speed.

6. The sport apparatus of claim 1, wherein the connection portion includes a Y-shaped portion, and the at least one sensor unit includes a pair of accelerometers mounted in each side of a mid-portion of the Y-shaped portion in order to monitor spin impact.

7. The sport apparatus of claim 6, wherein a first sensor unit of the at least one sensor unit is mounted on a free end of the handle, and the first sensor unit includes a communication device.

\* \* \* \* \*